United States Patent [19]

Schlüter

[11] Patent Number: 4,546,013

[45] Date of Patent: Oct. 8, 1985

[54] METHOD OF, AND APPARATUS FOR, MOISTENING LOOSE MATERIAL

[75] Inventor: Wilhelm Schlüter, Altenbeken, Fed. Rep. of Germany

[73] Assignee: Gebruder Lodige Maschinenbau-Gesellschaft mbH, Paderborn, Fed. Rep. of Germany

[21] Appl. No.: 415,679

[22] Filed: Sep. 7, 1982

[30] Foreign Application Priority Data

Sep. 18, 1981 [DE] Fed. Rep. of Germany ....... 3137109

[51] Int. Cl.[4] .......................... B32B 5/02; B05D 3/02

[52] U.S. Cl. .................................... 427/220; 427/221; 427/420; 427/425

[58] Field of Search ............... 427/240, 220, 420, 221, 427/425

[56] References Cited

U.S. PATENT DOCUMENTS

| | | | |
|---|---|---|---|
| 3,761,549 | 9/1973 | Marshall | 427/240 |
| 4,116,163 | 9/1978 | Torelli et al. | 427/240 |
| 4,241,692 | 12/1980 | Van Hijfte et al. | 427/220 |

*Primary Examiner*—Norman Morgenstern

*Assistant Examiner*—Janyce A. Bell

*Attorney, Agent, or Firm*—Merchant, Gould, Smith, Edell, Welter & Schmidt

[57] ABSTRACT

A method is disclosed of applying glue to loose fibrous material which is revolved relatively rapidly in a confined space. While this is happening, the glue and air under slight excess pressure are fed to the material from approximately the center of the space. Apparatus for this purpose comprises a container, a hollow shaft rotatably mounted in the container, and a plurality of rod-like tools secured to the hollow shaft. Each of the tools is generally cylindrical, and is provided with a central longitudinal bore one end of which opens into the hollow shaft and the other end of which is closed. Each tool has a longitudinally-extending flat external surface portion, and a plurality of substantially radial bores communicating with the central longitudinal bore. The radial bores of each tool terminate at the external surface of that tool in the zone of said flat portion thereof. Thus, glue can flow through the hollow shaft and be broken down into droplets as the glue is flung out of the radial bores of the tools by the centrifugal force caused by rotation of the hollow shaft.

4 Claims, 3 Drawing Figures

METHOD OF, AND APPARATUS FOR, MOISTENING LOOSE MATERIAL

BACKGROUND OF THE INVENTION

The invention relates to a method of, and apparatus for, moistening loose material; and in particular to a method of, and apparatus for, applying glue to loose fibrous material.

It is know to coat loose material, such as fibrous material, with glue by rotary spraying of the glue. For example, glue applying apparatus is known in which glue is flung out and broken into droplets by means of tools secured to a rotating shaft, the tools having longitudinal bores. The shaft is rotatably mounted in a container through which the loose material passes. The individual droplets of glue leave the tools one after the other, and at roughly equal distances apart along a specific path. The path of travel of each of the fluid droplets is determined by the speed of revolution of the shaft, and by its mass.

Since the individual droplets are flung away from the tools at very short distances apart, they almost form a jet which is sprayed substantially radially in a single plane. Unfortunately, it is highly probable that parts of the loose material that is to be treated are moistened by several very fine droplets before these parts have moved forward through the container. In the glue-coating of fibrous material, in which the glue is not distributed by a wiping effect between the individual small pieces of fibre, this phenomenon leads to over-concentration of glue at individual points, and therefore to a defective (speckled) surface of the boards formed from the fibrous material.

An object of the invention is to improve the moistening of loose material; and, in particular, the coating of fibrous material with glue so that a loose material, moistened more uniformly than has hitherto been possible, and in particular an extremely uniformly glue-coated fibrous material can be produced.

SUMMARY OF THE INVENTION

The present invention provides a method of moistening loose material which is revolved relatively rapidly in a confined space by causing a moistening agent to flow approximately from the centre of the space, wherein air under slight excess pressure is supplied together with the moistening agent. Thus, according to the invention, the moistening agent, such as glue, is caused to flow under virtually no pressure to the loose material that is to be moistened, by means of a centrifugal effect which results in the breaking down of the moistening agent into small drops or droplets. At the same time, air is blown in under slight excess pressure, for example, at a maximum pressure of 5 bars. Thus, the air flows at a greater velocity than does the moistening agent. The moistening agent is thus broken down into extremely fine droplets. Immediately following the breaking down into very fine droplets, these are caused to eddy in the air so that they cannot, as in the prior art method, pass into the loose material in a manner similar to a jet of liquid. Instead, they are deflected from such a path, the degree of deflection increasing with the eddying effect. This results in a spray pattern similar to that provided by a two-component nozzle, but without the need for supplying the moistening agent under pressure.

When glue-coating fibrous loose material, such as wood fibres, it is necessary that the glue, which is broken down into very fine droplets, should have a minimum droplet size. Otherwise, the coating of glue on the individual particles of loose material would be too thin, and the moisture content of the glue would drop too rapidly, so that the glue would not have sufficient adhesive power. By means of the method of the invention, a glue-air mixture, which meets this requirement, is passed to the loose material. This glue-air/mixture is filtered, as it were, on passing through the particle mass forming the loose material, and this mass is coated with glue in a much more uniform manner than has been hitherto possible. Thus, pressed boards produced from such a glue-coated particle mass exhibit no specks of glue which indicate excess coating with that material at individual points. Furthermore, economies in the amount of glue used can be achieved.

In accordance with a further feature of the invention, cold or even cooled air can be used so that, when processing warm fibrous material which has a temperature of 80° C. for example, a certain degree of cooling can be achieved, so that the added glue does not age-harden too rapidly.

The breaking down of the moistening agent, such as glue, that is to be passed to the loose material, occurs initially as a result of the centrifugal force occuring when the moistening agent travelling in an unpressurised state, is injected (coarse breakdown). The air, added at the same time, causes fine breakdown of the relatively coarse droplets of glue produced by the flinging action or centrifugal force. Moreover, as stated above, the air causes the very fine droplets that are produced to eddy before the moistening agent/air mixture encounters the loose material that is to be moistened.

The invention also provides apparatus for moistening loose material, the apparatus comprising a container, a hollow shaft rotatably and drivably mounted in the container, and a plurality of rod-like tools secured to the hollow shaft, wherein each rod-like tool is of cylindrical shape and is provided with a central longitudinal bore one end of which opens into the hollow shaft and the other end of which is closed, wherein each tool has a longitudinally-extending flat external surface portion and a plurality of substantially radial bores communicating with said central longitudinal bore, the radial bores terminating at the external surface of the tool in the zone of said flat portion, the apparatus being such that a moistening agent can flow through the hollow shaft and be broken down into droplets as the moistening agent is flung out of the radial bores of the tools by the centrifugal force caused by rotation of the hollow shaft. Because of the centrifugal action of the driven hollow shaft, the moistening agent, which arrives in a substantially pressure-less condition, is caused to flow outwardly through the central longitudinal bore of each of these tools. At the same time, air, under slight excess pressure, is passed through each of the central longitudinal bores. The moistening agent and the air are not, however, yet mixed with each other within the tools. The film of moistening agent is pulled away at the outer discharge points of the radial bores of each tool, and is broken down into droplets. The emerging air tears up these fluid droplets into still finer droplets, and also causes eddying of the very fine droplets with the air, so that a moistening agent/air mixture is created which penetrates into the loose material (fibrous material). The loose material is caused to swirl in the container by the tools, and said mixture passes through this swirling material. As the very fine droplets of moistening agent (glue) pass through the swirling loose material, they are deposited on particles of the loose material; and this results in only one very fine droplet encountering a particle of loose material, so that excess moistening (excess glueing) is avoided. Since the radial bores discharge outwardly in the zone dividing the cylindrical outer surface and the flat portion of each tool, particularly effective breaking down of the moistening agent into very fine droplets, and very uniform distribution of these droplets in the eddying air, are ensured.

In accordance with a further feature of the invention, the central longitudinal bore in each tool is provided with a frustoconical mouth portion at said one end. Thus, it is simple to adjust each tool, by screwing it into the hollow shaft, since a gradual transition into the central longitudinal bore is ensured even if the tool is not screwed into the hollow shaft to its full extent. Thus, no shoulder or step is present on which glue can deposit and age-harden. When the apparatus of the invention is in use, the bores in the tools are kept clear by the air which arrives under slight excess pressure, so that clogging with hardened glue is prevented. The air also loosens up the material that is to be moistened, that is to say the air causes a certain fluid-bed effect. On the other hand, the moistening agent/air mixture is prevented from coming into contact with the inner wall of the container, since a sufficient quantity of swirling loose material is always present between the radial bores of the tools and the inner wall.

The rod-like tools displace the air because of the rotary movements, so that the air is caused to eddy. Since the tools each have a flat external surface portion, these eddy air currents are prevented from having an adverse effect upon the spray pattern produced. The greatest turbulence prevails precisely at the points where the liiquid emerges from the tools in the zone of the flat portions.

Preferably, the radial bores of each tool terminate at the external surface of that tool in the regions where said flat portions merge with the cylindrical external surface of that tool. Thus, the moistening agent passes to the outermost ends of the radial bores, these ends being positioned at the edges between the flat portions and the cylindrical external surfaces of the tools. At these points the moistening agent is immediately broken down into the form of droplets, that is to say the flow of the moistening agent along the exterior of each rod-like tool is inhibited. Thus, even in the case of coarse breakdown, relatively fine droplets are obtained, which can be broken down still further by the action of the inflow of air under excess pressure.

The flow of air also increases the relative velocities of the tool and the loose material, so that moistening (glueing) is further improved.

BRIEF DESCRIPTION OF THE DRAWINGS

One from the glue applying apparatus constructed in accordance with the invention will now be described, by way of example, with reference to the accompanying drawings, in which.

DESCRIPTION OF PREFERRED EMBODIMENT

Figure 1:
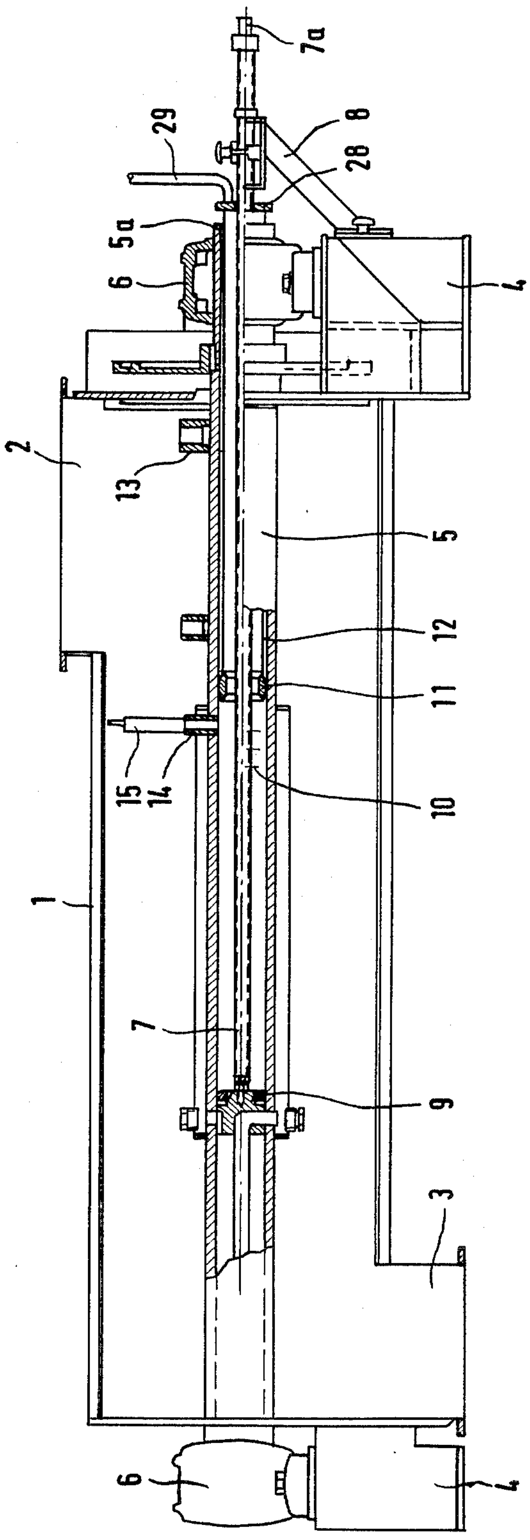
FIG. 1 is a part-sectional side elevation of the apparatus.

FIG. 1 shows glue applying apparatus which has a cylindrical container 1 provided with an upwardly-directed intake port 2 at one end, and with a downwardly-directed discharge port 3 at the other end. The container 1 is supported, at both ends, by brackets 4.

A hollow shaft 5 is positioned centrally within the container, the hollow shaft being rotatably mounted in journal bearings 6 located outside the container 1. The journal bearings 6 are secured to the brackets 4. The hollow shaft 5 is connected to a drive motor (not shown).

From the end of the container 1 shown as open in FIG. 1, a tube 7 extends into the hollow shaft 5. The outer end 7*a* of the tube 7 is adapted for connecting a hose or pipe (not shown). A glue mixture is able to pass through the tube 7 under virtually no pressure. The tube 7 is supported on the bracket 4 at the open end of the container 1 by a strut 8. The opposite end of the tube 7 is located adjacent to a sealing element 9 fitted in the hollow shaft 5. A row of outlet apertures 10 is located at the underside of the tube 7, through which apertures the glue is discharged on to the inner wall of the hollow shaft 5. A sealing ring 11, fitted in the hollow shaft 5, prevents return flow of the glue towards the open end 5*a* of the hollow shaft 5, and this sealing ring is held in position by a sleeve 12.

Figure 2:
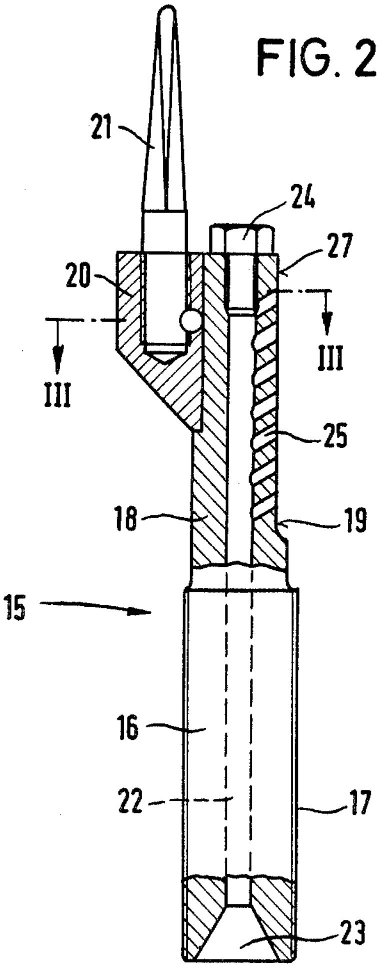
FIG. 2 is a part-sectional side elevation, on a larger scale, of one of the rod-like tools of the apparatus of FIG. 1; and, FIG. 3 shows a cross-section taken on the line III—III of FIG. 2.

Several nuts 13 are attached to the exterior of the hollow shaft 5, into which nuts can be screwed tools (not shown) which are designed to receive the loose material fed through the port 2, and to move it towards the port 3. To the rear of the nuts 13, as seen in the direction of flow within the container 1, several nuts 14 are inserted into the hollow shaft 5 (only one of the nuts 14 being shown in FIG. 1). A rod-like tool 15 can be screwed into each of these nuts 14. One of these tools 15 is shown diagrammatically in FIG. 1, whereas FIGS. 2 and 3 show details of such a tool on a larger scale.

Each rod-like tool 15 has a shank 16 provided with an external screw-thread 17 and with a head 18 of reduced diameter. The shank 16 and the head 18 are circular in plan view, that is to say they are bascially cylindrical in shape. However, on its rear side, the head 18 has a flat portion 19 (see FIG. 3). A ring 20 is provided on the front side of the head 18, into which ring is screwed an upstanding pointed element 21.

A longitudinal bore 22 extends through the entire tool 15, the longitudinal bore having a frustoconical mouth portion 23 at the lower end of the tool. The opposite end of the longitudinal bore 22 is closed off by means of a bolt 24. The glue, which is pressed out of the hollow shaft 5 and into the longitudinal bore 22 by centrifugal action, passes out of the bore 22 to the rear face of the tool 15 via radial bores 25. The bores 25 are inclined to the sides and upwardly, but extend substantially radially.

Figure 3:
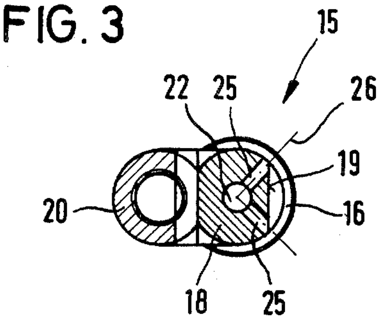

As shown particularly clearly in FIG. 3, the radial bores 25 terminate at the outer face of the head 18 so that the longitudinal axis 26 of each of them bisects the edge 27 along which the flat portion 19 merges with the cylindrical outer surface of the head. Thus, some of the radial bores 25 terminate at the cylindrical outer surface of the head 18, and others terminate at the flat portion 19. Thus, in the zones of the edges 27, the radial bores 25 form projecting points to which the glue flows from the longitudinal bore 22. When the hollow shaft 5 is rotated at a sufficiently great speed, the glue breaks up into droplets as it flows out of the bores 25, owing to the centrifugal force resulting from the rotation of the hollow shaft.

The outer end of the sleeve 12 is closed off by a cap 28. A pipe 29 runs into the cap 28, through which pipe is fed air which is under a slight excess pressure of, for example, 5 bars. This air flows through the hollow shaft 5 and into the rod-like tools 15. In the zone of the flat portion 19 of each tool 15, the air forms an eddy. This promotes the pulling off of the droplets of glue from the tools 15, and thus breaks them up into very fine droplets. It is important that the velocity of the concentrated air is greater than the velocity of flow of the glue supplied in a pressureless state, which glue flow velocity is achieved by the centrifugal effect.

The frustoconical portion 23 provided at the inlet end of the longitudinal bore 22 of each rod 15 enables the glue to flow in without passing through a transition zone; and it also permits non-turbulent admission of the compressed air, even when the tools 15 concerned are screwed only partially into their nuts 14.

We claim:

1. A method of applying glue to a loose fibrous material which is revolved relatively rapidly in a confined space by causing glue to flow in a substantially unpressurized state approximately from the centre of the space and breaking down the glue into droplets by means of a centrifugal force, wherein air under slight excess pressure is supplied together with the glue to cause further breakdown of the glue into finer droplets and to establish a uniform distribution of the finer droplets prior to contact with the fibrous material.

2. A method according to claim 1, wherein the air is supplied at a maximum pressure of approximately 5 bars.

3. A method according to claim 1, wherein the air is supplied at a higher velocity than that at which the glue is supplied.

4. A method according to claim 1, wherein the air which is supplied is colder than the loose fibrous material.

* * * * *

UNITED STATES PATENT AND TRADEMARK OFFICE

CERTIFICATE OF CORRECTION

PATENT NO. : 4,546,013

DATED : October 8, 1985

INVENTOR(S) : Wilhelm Schluter

It is certified that error appears in the above-identified patent and that said Letters Patent is hereby corrected as shown below:

Column 3, Line 36, for "eddy" read --eddying--.
Column 3, Line 39, for "liiquid" read --liquid--.
Column 3, Line 60, for "One from the glue" read --One form of the glue--.
Column 4, Line 45, for "bascially" read --basically--.

Signed and Sealed this

*Seventeenth* Day of *December 1985*

[SEAL]

*Attest:*

DONALD J. QUIGG

*Attesting Officer* *Commissioner of Patents and Trademarks*